United States Patent

Chao

[15] 3,688,307

[45] Aug. 29, 1972

[54] RING CORE KEYBOARD ENTRY DEVICE

[72] Inventor: Stanley K. Chao, Lexington, Mass.

[73] Assignee: Data Electronics Corporation, Burlington, Mass.

[22] Filed: Sept. 28, 1970

[21] Appl. No.: 76,189

[52] U.S. Cl. ................340/365, 178/17 C, 179/90 K, 340/174 AB, 340/174 SP

[51] Int. Cl. ............................G08c 1/00, G11c 17/00

[58] Field of Search.......340/174 AB, 174 SP, 365 L; 178/17 C; 179/90 K

[56] References Cited

UNITED STATES PATENTS 3,396,373 8/1968 Didic...................340/174 AB 3,319,234 5/1967 Brette..................340/174 AB

OTHER PUBLICATIONS

" Applications of Rope Memory Devices" Computer Design; Aug. 1964; pgs. 12 to 22; 340– 174 AB

*Primary Examiner*—James W. Moffitt
*Attorney*—Schiller & Pandiscio

[57] ABSTRACT

A keyboard entry device which employs a plurality of ring cores which are selectively threaded in a different combination by leads from a plurality of keys in a keyboard. Depending upon the particular keys depressed, a different combination of cores will be energized.

11 Claims, 5 Drawing Figures

STANLEY K. CHAO
INVENTOR.

BY

Schiller & Pandiscio

ATTORNEYS.

STANLEY K. CHAO
INVENTOR.

BY

Schiller & Pandiscio

ATTORNEYS.

RING CORE KEYBOARD ENTRY DEVICE

This invention relates to keyboard entry devices and more particularly to the techniques of using ring cores in keyboard types of devices, and to a ring core keyboard entry device.

A keyboard in the digital data processing and communications fields serves as an interface between the human operator and many types of electronic equipment including computers, displays, and other electronic as well as electro-mechanical instruments. A typical keyboard entry device consists of four basic elements: the key assembly, the encoder, the information control and the information storage, all driven, of course, from a power source of some type.

There are a number of different keyboard entry devices which have been used in the prior art. One type employs a purely electro-mechanical system using mechanical switches and springs with the major disadvantage that the reliability of the device is low primarily due to wear of the elements. Another type of keyboard entry devices includes the use of reed-relays. Although the reed-relay system represents an improvement over the use of mechanical switches and springs, the cost of reed-relays is relatively high and reliability is still a problem. The encoding system, generally a diode matrix, which is usually employed with either mechanical switches or reed-relay is not only costly, but has a questionable level of reliability due to the large number of elements requires in the matrix.

Still another approach is a system having photo-electric switching elements. While this system reduces the number of electro-mechanical linkages employed, other problems result from low reliability of the light source and from high cost electronic amplifiers. "Hall Effect" code generation which is used in yet another entry device is extremely costly because of the requirement for a separate code generator for each key. It also requires the ability to detect and amplify very low and temperature-variable signal outputs from the generators. The capacitive coupling approach uses the effect of capacitive variation as a result of key movement, and mechanical encoding of the key output. Such a system requires a separate set of capacitive circuits for each key and also suffers from the requirement to detect and amplify low and temperature-variable signals. Another approach utilizes a separate magnetic core and related amplification circuitry for each key which again is an expensive system. Such magnetic core systems have been utilized in electrical code translators.

An object of the present invention is to provide a keyboard entry device in which the foregoing disadvantages of the prior art are overcome by providing a reliable, easily operable, and economical unit. This object as well as others are accomplished by providing a keyboard entry device comprising a plurality of switching means adapted to be coupled to a source of power and a plurality of ring or transformer cores. A first plurality of electrically conductive means are provided, each being selectively threaded through a unique combination of cores and being connected to a corresponding one of the switching means so as to be connectable by the latter to the power source. Second separate electrically conductive means are coupled to each one of the cores so that upon actuation of any one of the switching means, an output signal is generated in corresponding second conductive means dependent upon the unique combination of cores which are threaded by the one of the first plurality of electrically conductive means connected to the actuated switching means.

The ring core keyboard entry device of the present invention has a number of unique characteristics and features. The ring cores may be either open, closed or split and may be of a wide variety of sizes and shapes. Since the output is a function of the magnitude of the input and the turns ratio between the first and second electrically conductive means, with a sufficient turns ratio, amplification of the output may be unnecessary, thereby reducing the cost of the device and enhancing its reliability. The first plurality of electrically conductive means may be simply wires which provide direct ground connections for the keys or switching means.

The basic ring core encoding technique is flexible and can be used in conjunction with different types of power sources, including direct current power supply, charging or discharging of energy source stored in capacitors, square wave power signal, and sinusoidal power source. The basic encoding technique can also be used with any one of many keys or switching means such as spring contact, reed contact, magnetic proximity switch, and capacitive coupling switches. When the power source used is of the continuously varying signal type, such as square wave and sinusoidal, and when used in conjunction with any of the key or switching means stated above, a sinusoidal or square wave signal at the input encoder will provide a continuous and similar sinusoidal or square wave signal at the output of the encoder. The output signal may then be detected by half or full wave rectifiers and the detected output levels will remain high as long as the key is depressed, eliminating the need for data latching or storage. A ring core may be used to detect the simultaneous depression of two or more keys and the output of the core used to lock the present device to either disable data output and/or signal an error condition.

The two-key roll-over feature, which is usually required in keyboard types of devices in order to allow rapid typing without error, is easily implemented through the ring core encoder due to the ability of a ring core to detect a two-key depression. The device of the present invention has no fixed mechanical linkage, there is no required specific alignment and the keys may be remotely located from the encoders and other electronic circuits. Since the device employs a limited number of ring cores and since the output of the ring core is large enough to enable direct coupling, the device of the present invention is extremely reliable and relatively inexpensive.

The ring core encoder of the present invention can be used to economically implement a keyboard which provides multiple codes which are selectable either through separate switches or electronic means, both of which could be internal or external to the keyboard device. The present device possesses the ability to implement multiple codes which are available simultaneously upon the depression of a specific key. In addition to the basic encoding function, ring cores can also be used to perform such basic logical functions as "AND," "OR," "EXCLUSIVE OR," "ANYONE," and "TWO OR MORE." Specifically utilized in the typical keyboard entry device described herein, the logical function, "ANYONE," is used to generate the strobe signal and the logical function, "TWO OR MORE," is used to generate an error signal.

Other objects of the invention will, in part, be obvious and will, in part, appear hereinafter. The invention accordingly comprises the apparatus possessing the construction, combination of elements, and arrangement of parts which are exemplified in the following detailed disclosure, and the scope of the application of which will be indicated in the claims:

Figure 1:
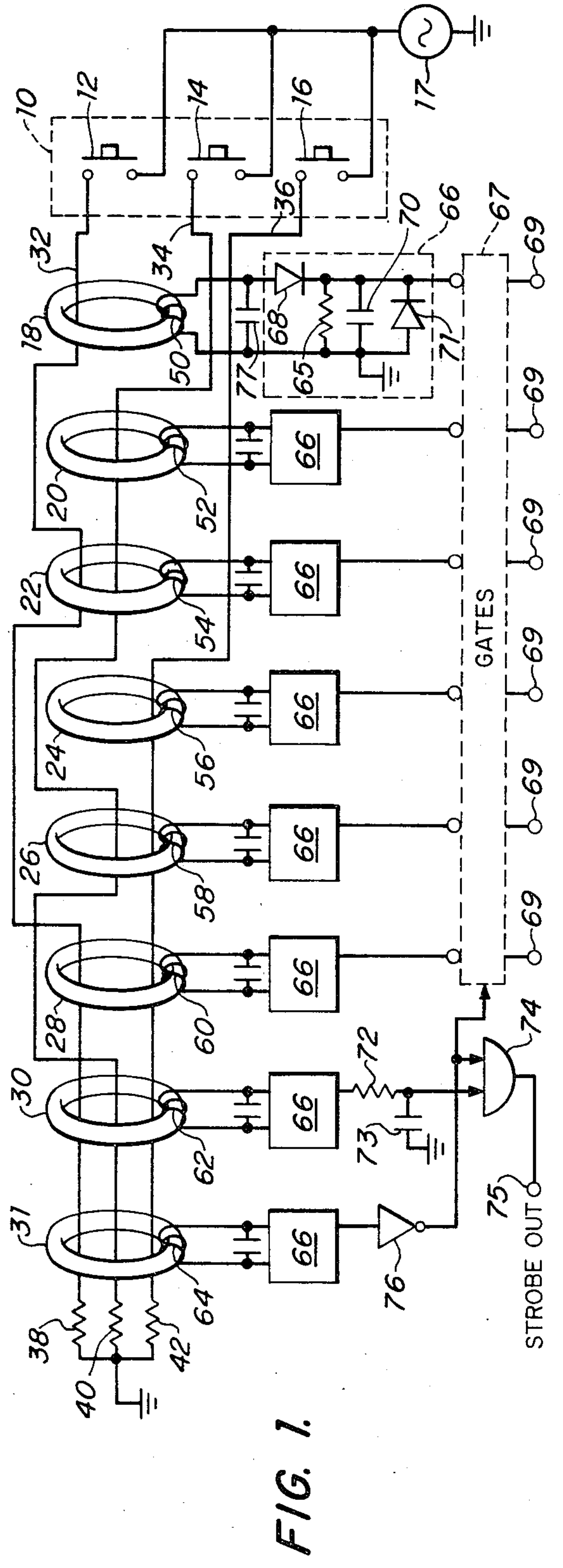
FIG. 1 is a schematic diagram of a basic keyboard entry device embodying the present invention.

Referring now to FIG. 1, there is shown a version of the present invention which includes a switch array or keyboard 10. The latter, for the sake of simplicity, is shown as a keyboard of only three keys 12, 14, and 16, although it will be apparent that the present invention may be utilized in a keyboard having any numbers of keys. The key used may be any one of a number of well known types of switching means, which, upon actuation, closes an electrical circuit. For example, the keys or switching means could be implemented by a switch contact either of the spring or magnetic reed version. One side of keyboard 10 is connected to power source 17, which is the form shown, and provides a sinusoidal a-c, typically at 150 KHz. Power source 17 is thus connected to one side of each of keys 12, 14, and 16.

A plurality of ring or transformer cores 18, 20, 22, 24, 26, and 28 are provided to serve as the encoding elements and as the interface between the mechanical keys and the electronic circuitry to be described. Obviously, the number of cores used depends on the code desired. The cores preferably are made of a material which has a relatively linear hysteresis characteristic. Although the cores are shown as the closed variety, they may also be either the open CI, open CC, open EE, or EI combinations, or split types. An open core is one made of two parts; for example, in a CI core, one part is in the shape of the letter C and the and the other in the shape of the letter I. Once the wires have been laid in the C portion the two parts are brought together to close the core. The open EI combination is quite similar, except that one of the parts is in the shape of the letter E. Open and split cores are useful because of the greater ease in wiring than in the case of a closed core. Two additional cores, 30 and 31, are also provided not for encoding purposes, but for ancillary functions of strobe pulse generation and to provide a disable output as will be seen later.

The other side of each of keys 12, 14, and 16, are coupled respectively to electrically conductive means such as lead wires 32, 34, and 36. Wires 32, 34 and 36 are selectively threaded through the ring cores such that each wire passes through a unique combination of cores. The exact threading arrangement depends on the encoding requires. In the embodiment shown, wire 32 is threaded through cores 18, 22, 28, 30, and 31, but is not threaded through cores 20, 24, and 26. Wire 34 is threaded through cores 20, 22, 26, 30 and 31, but is not threaded through cores 18, 24 and 28. Wire 36 is threaded through cores 24, 26, 28, 30 and 31, but is not threaded through cores 18, 20, and 22.

All three wires 32, 34, and 36, pass through a ring, cores 30 and 31; core 30 is used to detect the depression of any and all key switches and provide a strobe signal. Core 31 is used to detect the simultaneous depression of two or more keys. The output of core 31 can be used to disable strobe signaling, to disable data output, and/or to signal an error condition which will be described with the operation of the device. After passing through core 31, all the wires 32, 34, and 36 are connected through respective load resistors 38, 40, and 42 to ground.

Each of the ring cores 18, 20, 22, 24, 26, 28, 30, and 31 have second separate electrically conductive means in the form of respective secondary windings 50, 52, 54, 56, 58, 60, 62, and 64 wound thereabout. Each of the secondary windings except winding 64 may have any desired number of turns, although all preferably have the same number, and preferably the turns ratio between the secondary windings and the wires 32, 34 and 36 are selected such that there are sufficient turns on the secondary to generate an output suitable to drive the electronic circuits without amplification. In order to give the logical effect of two or more, the number of turns for winding 64 is one-half of the number of turns on any of the other windings. Thus, only one-half as much signal is generated when only one key is depressed. When two or more keys are depressed, a full output will be generated. With this arrangement each core serves as a transformer, the primary winding of which is the corresponding wire connected to the depressed key, and the secondary winding of which is used to generate the output signal. The secondary winding of all the cores are each connected at one end to a corresponding half wave rectifier circuit 66 for each core, which detects the sinusoidal signals and converts them into logical levels. These logical levels could be fed directly to an external device or fed through optional gate 67 to data output terminal 69. A typical circuit 66 is formed by grounding one side of winding 50 and placing paralleled resistor 65, capacitor 70 and diode 71 across winding 50. Another diode 68 is placed in series between the high side of winding 50 and the common connection for resistor 65 and capacitor 70.

The output line from rectifier 66 connected to strobe core output winding 62 and is provided with a time delay circuit formed of series resistor 72 and shunt capacitor 73. The output of this time delay circuit is connected to gate 74. The strobe signal from the output of gate 74 at terminal 75 will signify to the external circuit that data is available from the keyboard device. Core 31, which generates the error signal has its output winding 64 giving a signal through rectifier 66 and then detector circuit 76. As indicated before, winding 64 has half as many turns as the other windings; thus, only half as much voltage value is fed into circuit 76, which may be of any well known design and is a threshold circuit.

The threshold value of circuit 76 is chosen such that simultaneous depression of two or more of the keys will cause the threshold value to be exceeded producing an inhibit signal from circuit 76. The output of circuit 76 is used both to inhibit strobe signal through gate 74 and to hold data signal at zero through gate 67.

In the operation of the device in FIG. 1, depression of, for example, key 12 energizes cores 18, 22, 28, 30, and 31 to create an output from each core which is fed through corresponding rectifier from the corresponding secondary windings 50, 54, 60, 62, and 64.

If two or more of the keys are simultaneously depressed, an output signal of sufficient value is applied to threshold circuit 76, which provides an output signal which block both strobe signal and data lines. Upon release of all keys and the next depression of a single key, the signals from the respective secondary windings are again fed through to output terminals.

The above described sequence of operation is a typical case where the keyboard is operated as a real time device. The external equipment, such as a central computer or other control logic, must be ready to receive the information as soon as and as long as the keyboard is operated. In other cases, however, the operation of the keyboard can be used in a "lock step" fashion. The lock-step operation, when a key is depressed, is such that information becomes available and a signal is sent to the central computer or external logic signifying data is available. The data output from the keyboard must be held until an acknowledged signal is received from the central computer. In this case, the strobe signal indicated here will not be generated by the keyboard, but instead by the central computer and it is not necessary then to provide the device with core 30. "Strobing" or timing indications that a signal is present due to depression of a key is provided by the output of gate 74. It should be noted that the strobe signal generated by core 30 and rectified by corresponding rectifier 66 is delayed by the time delay provided by resistor 72 and capacitor 73.

The optimum frequency for the input a-c from source 17 is selected in the region of about 150 to 200 KHz because somewhere at higher frequencies the core losses become excessive and at somewhat lower frequencies the device requires an undesirably large number of turns on the secondary winding to be efficient.

Ordinarily, in a group of cores, one finds that the permeability at room temperature will typically vary as much as, for example, 20 percent from core to core. Additionally, electrical characteristics, such as permeability, of cores are usually quite temperature-variable. Hence, in the present system as exemplified by FIG. 1, improved system performance is realized by tuning; i.e., the secondary windings (such as 50 on core 18) are resonated at the frequency of source 17 by small capacitors 77. The increase in output over a nonresonant transformer secondary circuit and the broadness of the frequency range over which an increased output is available depend upon the loading of the resonant circuit: the ratio of the circuit impedance to the loading impedance or "Q."

Considerations of production tolerances, temperature coefficients of components, required temperature range and the like dictate a low Q (on the order of 1.5 to 20).

This can result in an over-all output voltage increase of about 6 db relative to the untuned circuit or one-fourth the drive power for equivalent voltage output.

If some care is taken in the selection of cores, and identical resonants circuits are used in the oscillator tank and core outputs, a temperature range of −20° Centigrade to + 85° Centigrade can be accommodated with only moderate fall-off in performance at the extremes in spite of a 30 percent change in frequency over that range of temperature, and one can readily establish unambiguous logic levels for the core outputs despite variations in permeability from core to core.

Figure 2:
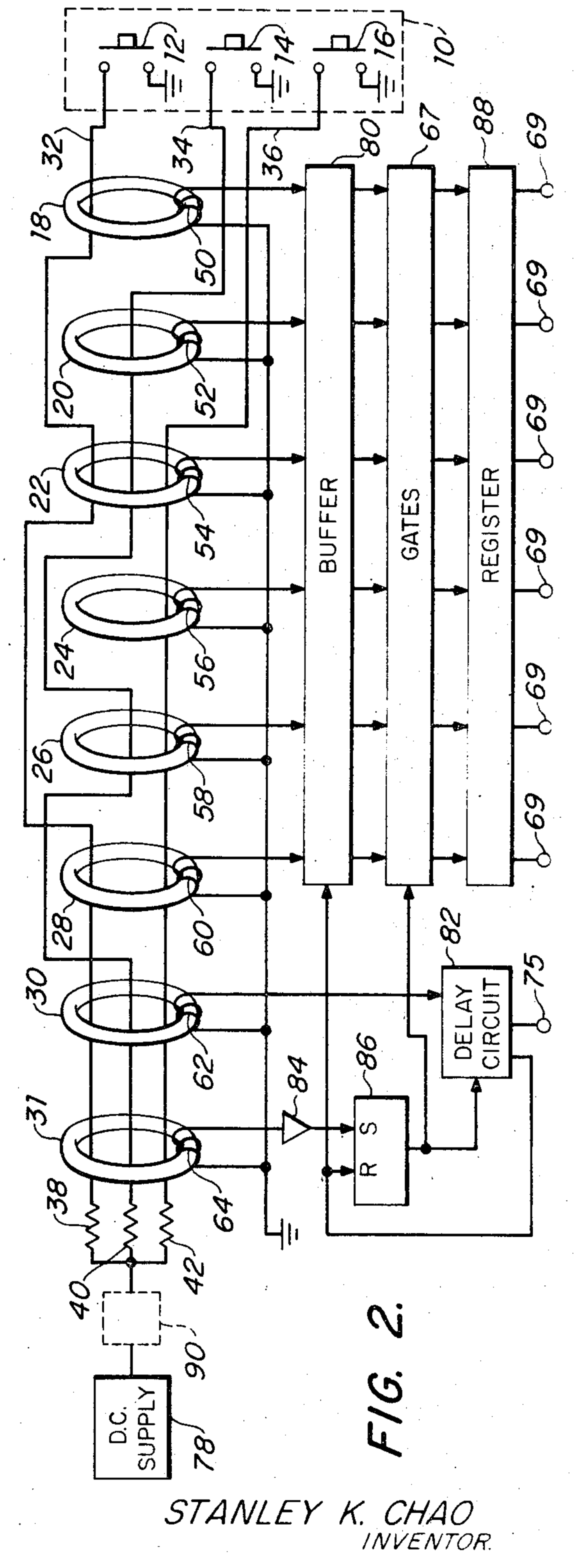
FIG. 2 is a schematic diagram of another version of a keyboard entry device embodying the present invention.

A different implementation of the basic device is illustrated in FIG. 2. In this case, instead of an a-c power source, a direct current power supply 78 is utilized. Power supply 78 could be a direct current voltage source or a capacitor which is either fully charged or completely discharged prior to the operation of key switches. There is provided keyboard 10 in which, instead of being mutually connected directly to a power supply, all of the switches 12, 14 and 16 have one side connected to ground. The device also includes lines 32, 34, and 36, which are connected to switches 12, 14, and 16, respectively as in FIG. 1, and threaded through cores having secondary windings in the same manner as the device of FIG. 1. However, instead of being connected to rectifiers, each of the secondary windings has one side connected to a common ground and the other side of windings 50, 52, 54, 56, 58, and 60, is fed into buffer storage 80.

The other side of winding 62 is connected to the input of a time delay circuit 82 to provide a delayed strobe pulse at output terminal 75.

The other side of winding 64 is connected through threshold amplifier 84 to the set input terminal of a bistable device such as flip-flop 86. The output of the latter is intended to provide inhibit signals and is connected to inhibit operation of delay circuit 82 so that the latter provides then no output signal.

The data output terminals of buffer 80 are selectively coupled through gates 67 to data register 88. The outputs of the latter are apparent at data terminals 69. The operation of gates 67 can also be inhibited inasmuch as the gates are also connected to the output of flip-flop 86. Lastly, the output from circuit 82 is connected to both the reset terminal of flip-flop 86 and to enable transfer of data from buffer storage 80 to gate 67.

As an optional item, network 90 can be inserted between power supply 78 and load resistors 38, 40 and 42. One desirable function of network 90 would be to disconnect power supply 78 right after a switch is depressed but before the data is transferred out of buffer 80 and register 88. This optional network may be desirable in the case where the operation of the keyboard device is "lock-stepped" with a central computer.

In operation, the device of FIG. 2 operates quite similarly to that of FIG. 1. However, when any of key switches 12, 14, or 16 in keyboard 10 is depressed, a pulse is generated at each of the appropriate secondary windings of the transformer cores. Since the signals generated on these secondary windings are pulses, it is necessary to store them in a buffer such as 80. As noted, the output of flip-flop 86 is used to inhibit terminals of gate 67 thus preventing transfer of erroneous data into output register 88. The strobe signal generated through winding 62 upon depressing any of the key switches 12, 14, and 16, is delayed by circuit 82 before transmission, for example, to central computer. If an error is detected by core 31, the strobe signal will be inhibited by the output of flip-flop 86 as applied to circuit 82.

Figure 3:
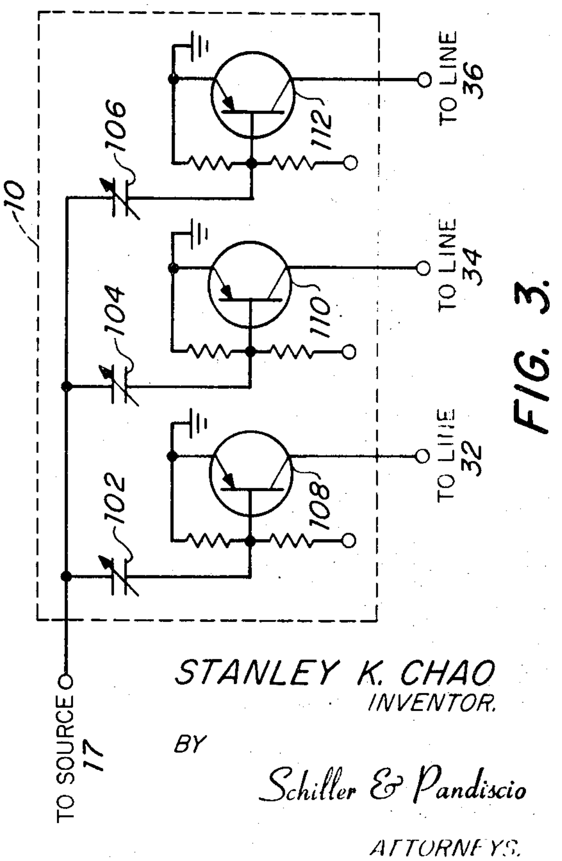
FIG. 3 is a circuit diagram of an alternative form of keyboard switches that are useful in an alternative version of the embodiment of FIG. 1.

Still another implementation of the keyboard entry device embodying the present invention is shown in FIG. 3 wherein there is shown a different form of keyboard 10 for use with the remainder of the circuit of FIG. 1. Keyboard 10 of FIG. 3 differs in that switches 12, 14, and 16 of FIG. 1 are replaced by switches 102, 104, and 106 which are of the known capacitive coupling type. Depressing of a capacitive coupling switch such as 102 will change the impedance level of the capacitive gap in the switch. Amplifier circuits 108, 110, and 112 connect immediately to capacitive switches 102, 104, and 106. Output of these amplifiers are respectively connected to the primary windings 32, 34, and 36 of the ring cores as shown. Amplifiers 108, 110, and 112 can be eliminated if the change of capacity before and after a given key is depressed is large enough so as to allow adequate signal-to-noise ratios at the secondary windings of the cores. The embodiment FIG. 3 illustrates a system which can be a complete solid state implementation of the present invention. Theoretically, a solid-state implementation of the keyboard should give better keyboard reliability since current is not interrupted through metal contacts in the key switches.

Figure 4:
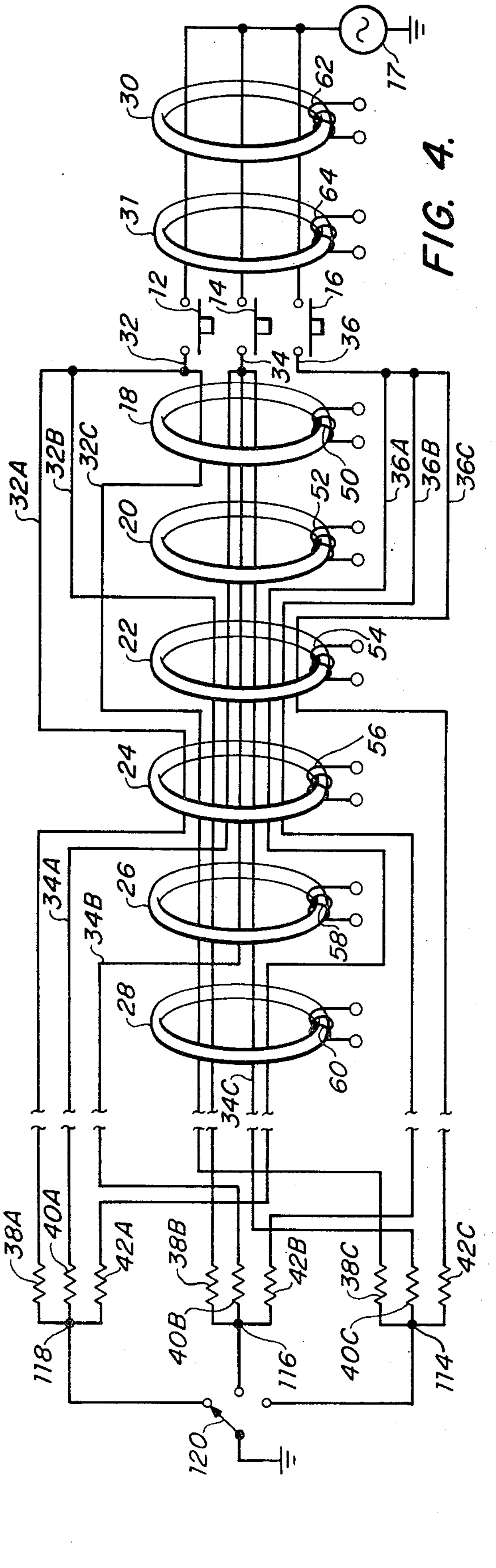
FIG. 4 is yet another alternative embodiment of the present invention for providing selectable multiple code outputs.

In FIG. 4, an implementation of multiple code keyboard entry device is illustrated, and is basically a variation of the system of FIG. 1. However, it will be seen that the strobe and error cores 30 and 31 are, for simplicity, relocated between power source 17 and switches 12, 14, and 16. In the variation shown in FIG. 4, each of lines 32, 34, and 36 is split into three trunks represented by an alphabetical suffix. Thus, line 32 is split into 32A, 32B, and 32C. The number of trunks used depends upon the number of codes that one wishes to create and the choice of three is merely exemplary. The difference between codes is created by the different configuration that the trunks take threading the cores. For example, note that trunk lines 32C, 34C, and 36C, after traversing variation cores are coupled through corresponding load resistors 38C, 40C and 42C to junction 114. Similarly, trunk lines 32B, 34B, and 36B, after following another pattern of wiring through and around the cores are connected through respective resistors 38B, 40B, and 42B to junction 116. Lastly, trunk lines 32A, 34A, and 36A are threaded through the cores to provide a unique combination and are coupled through resistors 38A, 40A and 42A to junction 118. Switch means 120 are provided for selectively connecting only one of junctions 114, 116, or 118 to ground at a given moment. Hence, one, for example, may thread the cores with trunk lines 32A, 34A and 36A so that the output signals at the secondary, when switch 120 is connected to junction 118, is typically a BCD code. Similarly one can thread the cores with the other trunks of wires 32, 34, and 36, to provide other codes, such as four-eighths, ASC 11 and others at respective junctions 114 and 116. The threading shown in FIG. 4 is intended to be merely illustrative and is not to be considered representative of any specific code or codes.

Figure 5:
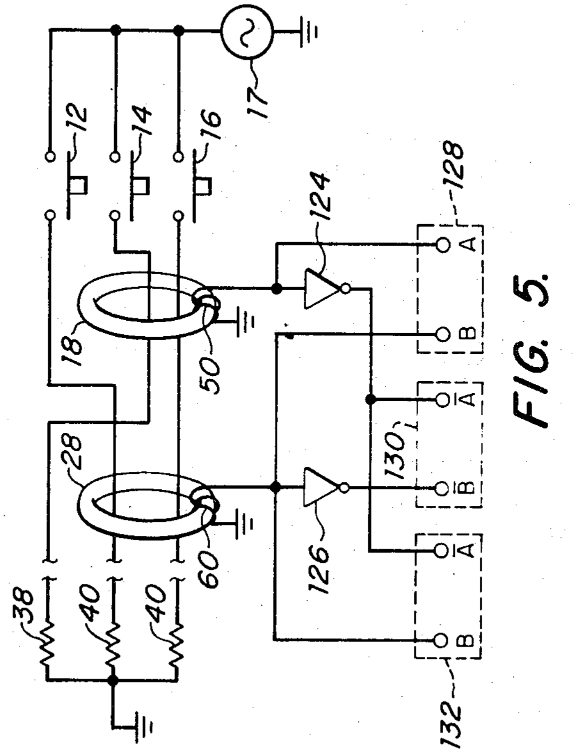
FIG. 5 is a schematic diagram of a simplified version of an embodiment of the present invention which is intended to provide a plurality of different code outputs simultaneously.

It will be recognized that the system of FIG. 4 is intended to provide a plurality of different output codes selected sequentially according to the positioning of selector switch 120. The embodiment of FIG. 5 (with only two typical cores 18 and 28 for simplicity) is intended to provide a simultaneous multiple code output system, and includes source 17, switches 12, 14 and 16, a plurality of cores and secondary windings all as in FIG. 1. For simplicity also, resonant rectifier circuits, the strobe core and error core of FIG. 1 have all been omitted in the showing in FIG. 5. It will be seen, however, that the device of FIG. 5 employs an inverter for each core output. Hence, secondary windings 50 and 60 are connected respectively to the inputs of inverters 124 and 126. By selecting inverted and not inverted outputs (respectively A and $\bar{A}$ from winding 50, and B and $\bar{B}$ from winding 60), one can form a series of different codes from the core outputs. For example, from merely two cores, as shown, the noninverted outputs can be fed to form code block 128. If one assumes that A and B are represented by a no-signal condition and the inversions are a given signal level above zero, then the zero state of the keyboard at code block 128 is no signals on either terminal A or B. The inverted signals from cores 18 and 28 can be fed as shown to form code block 130 wherein the zero condition of the keyboard is represented by the given signal levels being present on both terminals $\bar{A}$ and $\bar{B}$. Similarly, by combining an inverted output of one core with the noninverted output of another, one can form code block 132 wherein the zero state of the keyboard appears as no signal on terminal B and a given signal level on terminal $\bar{A}$.

Since certain changes may be made in the above apparatus without departing from the scope of the invention herein involved it is intended that all matter contained in the above description or shown in the accompanying drawing shall be interpreted in an illustrative and not in a limiting sense.

What is claimed is:

1. A keyboard entry device comprising:

a source of current varying substantially sinusoidally in time, a plurality of ring cores;

a plurality of electrically conductive lines, being threaded through a unique combination of one or more of said cores a plurality of switching means each for connecting said source to a corresponding one of said conductive lines so as to pass said current through the latter and thereby induce a varying magnetic field in each of said cores through which said one line is threaded; and a plurality of secondary windings, each coupled to one of said cores so that upon actuation of any one of said switching means, a sinusoidally varying output signal is generated in the corresponding secondary winding.

2. A device as set forth in claim 1 including means for generating a strobe output signal after a predetermined delay following actuation of any of said switching means, said means for generating comprising one of said cores threaded by all of said lines.

3. A device as set forth in claim 2 further including means for disabling any output signal upon substantially simultaneous actuation of two or more of said switching means.

4. A device as set forth in claim 3 wherein said means for disabling includes a separate ring core threaded by all of said electrically conductive lines and having a secondary winding would therearound whereby simultaneous closure of two or more of said switching means disables any output signal from any of the other ring cores.

5. A device as set forth in Claim 1 wherein said ring cores are made of material having a substantially linear hysteresis characteristic.

6. A device as set forth in claim 1 wherein said output signal generated in each of said secondary windings is detected by rectifying means.

7. A device as set forth in claim 1 wherein said switching means are capacitive switches.

8. A device as set forth in claim 1 wherein each of said plurality of electrically conductive lines is a single electrical lead.

9. A device as set forth in claim 1 including means for inverting the output from each of said individual conductive lines, and means for combining selected inverted and noninverted outputs from each of said individual conductive lines so as to form a plurality of different signal combinations from said plurality of cores.

10. A device as set forth in claim 1 wherein each of said plurality of electrically conductive lines is a corresponding plurality of trunk lines, each of said trunk lines of a corresponding one of said first plurality being threaded through a different combination of cores than the other lines of that trunk.

11. A device as set forth in claim 10 including means for coupling one trunk line from each of said plurality to a corresponding common terminal, and means for selectively switching any one of said terminals to be energized from said source.

* * * * *